United States Patent
Dillon et al.

(10) Patent No.: US 12,234,593 B2
(45) Date of Patent: Feb. 25, 2025

(54) IMAGE RECOGNITION PROCESSES FOR DETECTING TANGLING IN A WASHING MACHINE APPLIANCE

(71) Applicant: Haier US Appliance Solutions, Inc., Wilmington, DE (US)

(72) Inventors: Nicholas Matthew Dillon, Louisville, KY (US); Matthew R. Hunter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1003 days.

(21) Appl. No.: 17/110,396

(22) Filed: Dec. 3, 2020

(65) Prior Publication Data

US 2022/0178064 A1    Jun. 9, 2022

(51) Int. Cl.

| | |
|---|---|
| *D06F 34/18* | (2020.01) |
| *D06F 33/00* | (2020.01) |
| *D06F 33/32* | (2020.01) |
| *D06F 33/47* | (2020.01) |
| *D06F 103/02* | (2020.01) |
| *D06F 105/02* | (2020.01) |
| *D06F 105/58* | (2020.01) |
| *D06F 105/62* | (2020.01) |
| *G06N 3/04* | (2023.01) |
| *G06N 20/00* | (2019.01) |

(52) U.S. Cl.
CPC ............. *D06F 34/18* (2020.02); *D06F 33/00* (2013.01); *D06F 33/32* (2020.02); *D06F 33/47* (2020.02); *G06N 3/04* (2013.01); *G06N 20/00* (2019.01); *D06F 2103/02* (2020.02); *D06F 2105/02* (2020.02); *D06F 2105/58* (2020.02); *D06F 2105/62* (2020.02)

(58) Field of Classification Search
CPC .............................. D06F 34/18; D06F 2103/02
See application file for complete search history.

(56) References Cited

U.S. PATENT DOCUMENTS

| | | | |
|---|---|---|---|
| 4,411,664 A | * | 10/1983 Rickard | ................. D06F 34/16 68/12.14 |
| 10,215,491 B2 | | 2/2019 Ashrafzadeh et al. | |
| | | (Continued) | |

FOREIGN PATENT DOCUMENTS

| | | |
|---|---|---|
| CN | 109183354 A | 1/2019 |
| CN | 11004664 A | 7/2019 |
| | (Continued) | |

OTHER PUBLICATIONS

WO2020039836A1 Machine Translation (Year: 2020).*

*Primary Examiner* — Spencer E. Bell
(74) *Attorney, Agent, or Firm* — Dority & Manning, P.A.

(57) ABSTRACT

A method of operating a washing machine appliance is provided. The washing machine appliance includes a wash basket rotatably mounted within a wash tub and defining a wash chamber configured for receiving of a load of articles. A camera is positioned with a view of the wash chamber. The method includes obtaining one or more images of the wash chamber with the camera, analyzing the one or more images using a machine learning image recognition process to determine that the articles are tangled, and adjusting at least one operating parameter of the washing machine appliance in response to determining that the articles are tangled.

18 Claims, 8 Drawing Sheets

(56) References Cited

U.S. PATENT DOCUMENTS

| | | | | |
|---|---|---|---|---|
| 2005/0268670 A1* | 12/2005 | Hirasawa | ................ | D06F 33/40 68/12.02 |
| 2008/0109967 A1* | 5/2008 | Ashrafzadeh | ........... | D06F 33/47 68/12.02 |
| 2019/0169780 A1* | 6/2019 | Chen | .................. | G05B 19/0426 |
| 2019/0382941 A1 | 12/2019 | Hwanng et al. | | |
| 2021/0164142 A1* | 6/2021 | Ka | .......................... | D06F 33/47 |
| 2021/0214874 A1* | 7/2021 | Iancu | ................... | G06V 10/803 |
| 2021/0404103 A1* | 12/2021 | Park | ...................... | H04N 23/57 |

FOREIGN PATENT DOCUMENTS

| | | | | |
|---|---|---|---|---|
| JP | 2019/130184 A | 8/2019 | | |
| WO | WO-2020039836 A1 * | 2/2020 | ............. | D06F 33/48 |

* cited by examiner

IMAGE RECOGNITION PROCESSES FOR DETECTING TANGLING IN A WASHING MACHINE APPLIANCE

FIELD OF THE INVENTION

The present subject matter relates generally to washing machine appliances, or more specifically, to systems and methods for using image recognition processes to improve or optimize operation of washing machine appliances

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket and/or an agitator can rotate at various speeds to agitate articles within the wash chamber, to wring wash fluid from articles within the wash chamber, etc. During a spin or drain cycle of a washing machine appliance, a drain pump assembly may operate to discharge water from within sump.

During agitation, articles can become tangled. Tangled articles can be locked together such that the articles do not rub against the wash basket, the agitator, and/or one another. Thus, the agitation cycle may be ineffective to suitably clean tangled articles. Tangled articles may also cause an out-of-balance condition during a spin cycle. In general, tangling can lead to consumer dissatisfaction with the performance of a washing machine appliance.

Accordingly, a washing machine appliance with features for improved wash performance would be desirable. More specifically, a system and method for detecting tangled articles would be particularly beneficial.

BRIEF DESCRIPTION OF THE INVENTION

Advantages of the invention will be set forth in part in the following description, or may be apparent from the description, or may be learned through practice of the invention.

In one example embodiment, a washing machine appliance includes a wash tub positioned within a cabinet. A wash basket is rotatably mounted within the wash tub and defines a wash chamber configured for receiving a load of articles. A camera is mounted to the cabinet in view of the wash chamber. A controller is operably coupled to the camera. The controller is configured to obtain one or more images of the articles within the wash chamber from the camera, analyze the one or more images using a machine learning image recognition process to determine that the articles are tangled, and adjust at least one operating parameter of the washing machine appliance in response to determining that the articles are tangled.

In another example embodiment, a method of operating a washing machine appliance is provided. The washing machine appliance includes a wash basket rotatably mounted within a wash tub and defining a wash chamber configured for receiving of a load of articles. A camera is positioned with a view of the wash chamber. The method includes obtaining one or more images of the wash chamber with the camera, analyzing the one or more images using a machine learning image recognition process to determine that the articles are tangled, and adjusting at least one operating parameter of the washing machine appliance in response to determining that the articles are tangled.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
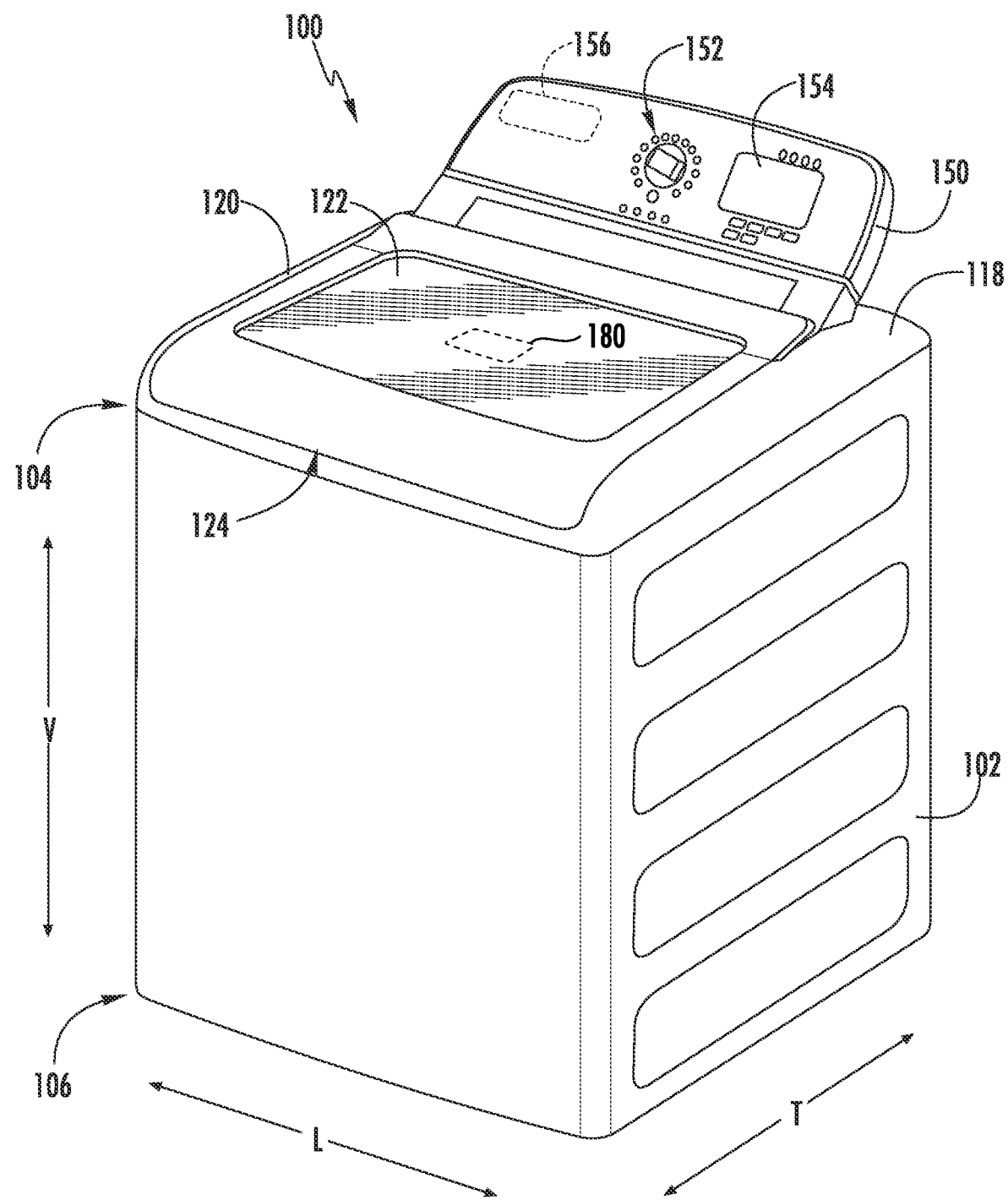
FIG. 1 is a perspective view of a washing machine appliance according to an example embodiment of the present subject matter with a door of the example washing machine appliance shown in a closed position.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 2:
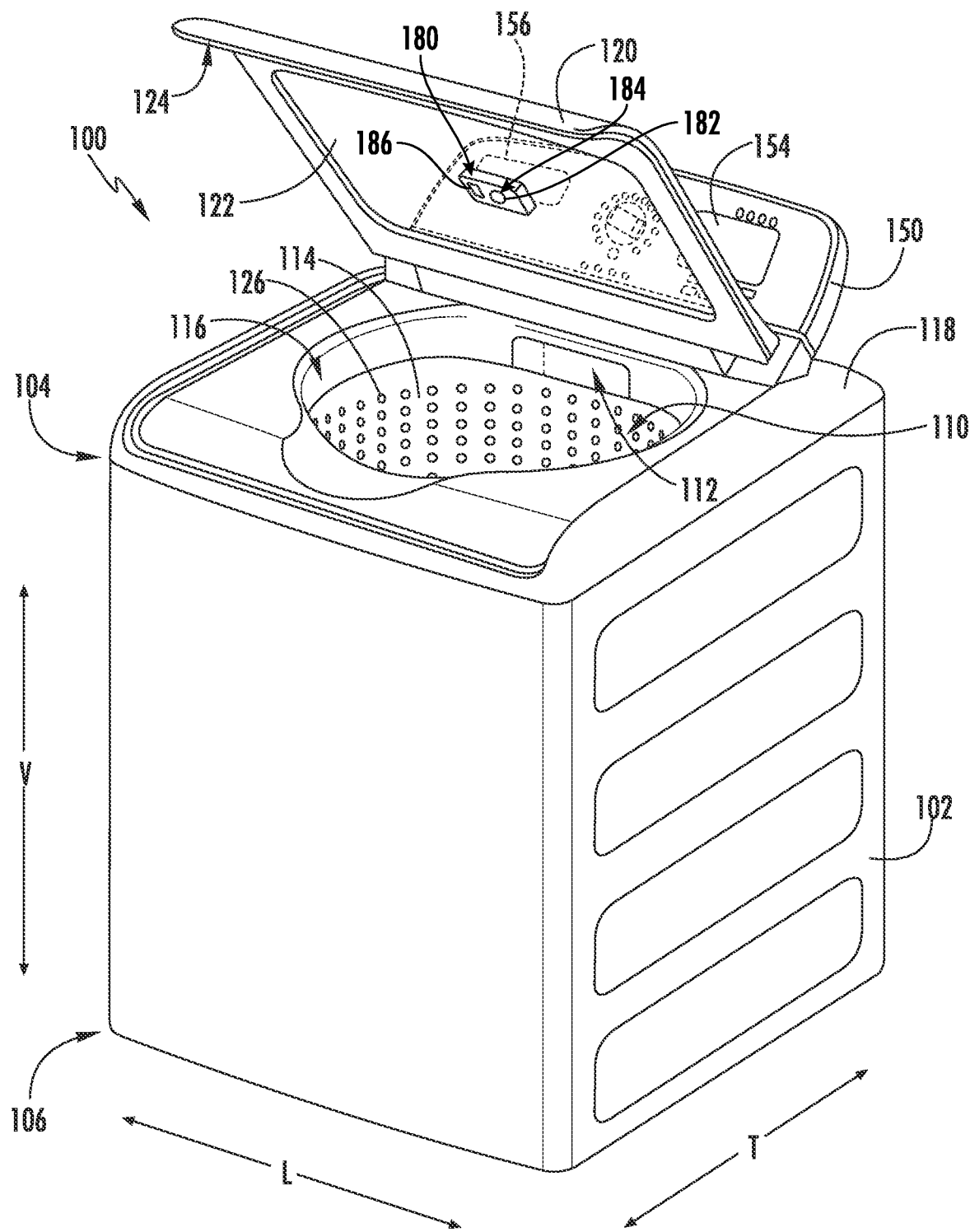
FIG. 2 is a perspective view of the example washing machine appliance of FIG. 1 with the door of the exemplary washing machine appliance shown in an open position.
Figure 3:
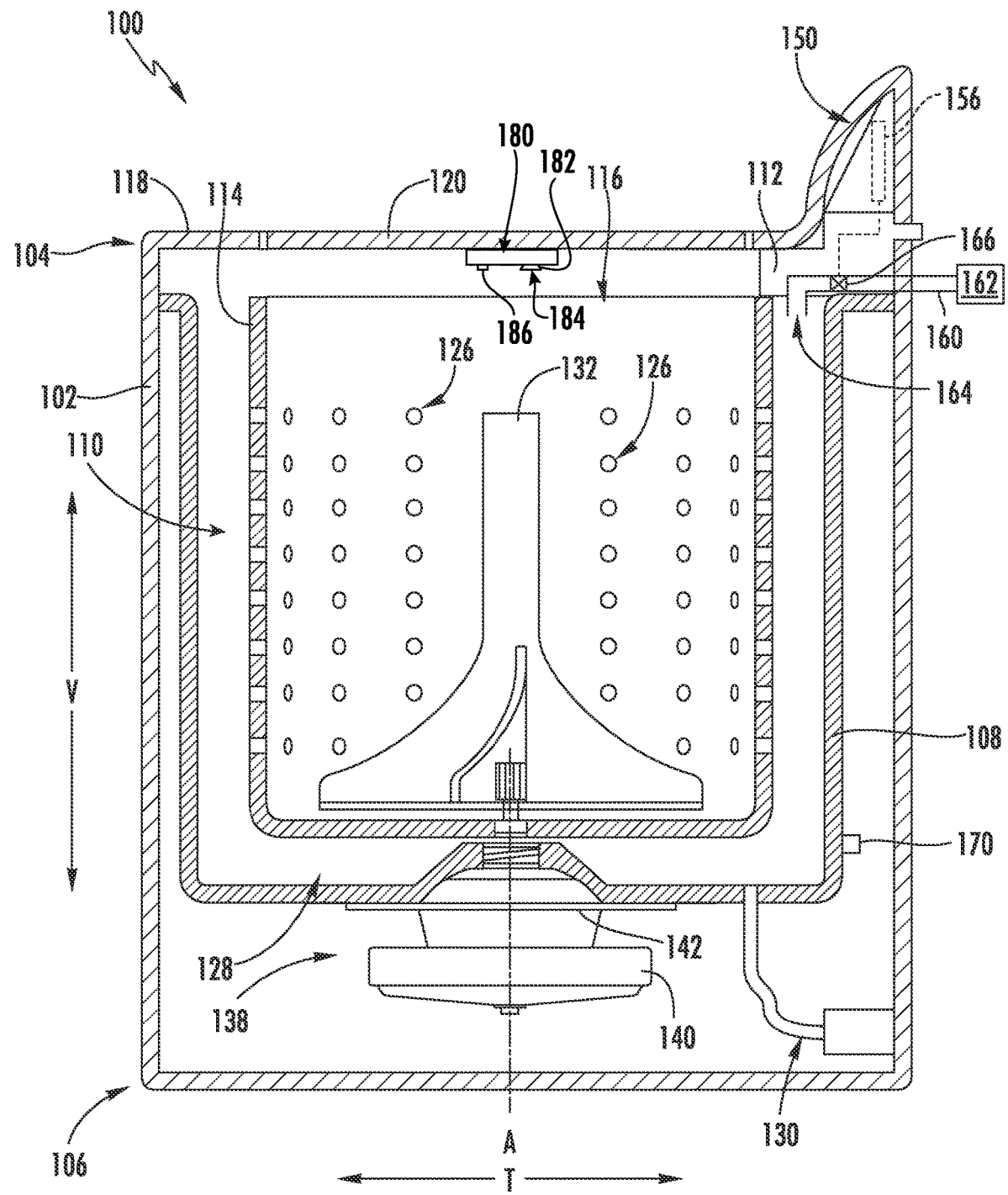
FIG. 3 is a side section view of the example washing machine appliance of FIG. 1.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, which are mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser 112 (FIG. 2) for dispensing wash fluid into wash tub 108. The term "wash fluid" refers to a liquid used for washing and/or rinsing articles during an operating cycle and may include any combination of water, detergent, fabric softener, bleach, and other wash additives or treatments.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An agitator 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitator 132 extends into wash basket 114 and assists agitation of articles disposed within wash basket 114 during operation of washing machine appliance 100, e.g., to facilitate improved cleaning. In different embodiments, agitator 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitator 132 and wash basket 114 are oriented to rotate about axis of rotation A (which is substantially parallel to vertical direction V).

As best illustrated in FIG. 3, washing machine appliance 100 includes a drive assembly 138 in mechanical communication with wash basket 114 to selectively rotate wash basket 114 (e.g., during an agitation or a rinse cycle of washing machine appliance 100). In addition, drive assembly 138 may also be in mechanical communication with agitator 132. In this manner, drive assembly 138 may be configured for selectively rotating or oscillating wash basket 114 and/or agitator 132 during various operating cycles of washing machine appliance 100.

More specifically, drive assembly 138 may generally include one or more of a drive motor 140 and a transmission assembly 142, e.g., such as a clutch assembly, for engaging and disengaging wash basket 114 and/or agitator 132. According to the illustrated embodiment, drive motor 140 is a brushless DC electric motor, e.g., a pancake motor. However, according to alternative embodiments, drive motor 140 may be any other suitable type or configuration of motor. For example, drive motor 140 may be an AC motor, an induction motor, a permanent magnet synchronous motor, or any other suitable type of motor. In addition, drive assembly 138 may include any other suitable number, types, and configurations of support bearings or drive mechanisms.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of input selectors 152. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed or rinsed. By way of example for a wash mode, once wash basket 114 is properly filled with fluid, the contents of wash basket 114 can be agitated (e.g., with agitator 132 as discussed previously) for washing of laundry items in wash basket 114.

Washing machine appliance 100 may include a water supply conduit 160 that provides fluid communication between a water supply source 162 (such as a municipal water supply or well) and a discharge nozzle 164 for directing a flow of water into wash chamber 110. In addition, washing machine appliance 100 includes a water fill valve or water control valve 166 which is operably coupled to water supply conduit 160 and communicatively coupled to controller 156. In this manner, controller 156 may regulate the operation of water control valve 166 to regulate the amount of water within wash tub 108. Although water supply conduit 160, water supply source 162, discharge nozzle 164, and water control valve 166 are all described and illustrated herein in the singular form, it should be appreciated that these terms may be used herein generally to describe a supply plumbing for providing hot and/or cold water into wash chamber 110. In this regard, water supply conduit 160 may include separate conduits for receiving hot and cold water, respectively. Similarly, water supply source 162 may include both hot-water and cold-water supplies regulated by dedicated valves. In addition, washing machine appliance 100 may include one or more pressure sensors 170 for detecting the amount of water and or clothes within wash tub 108. For example, pressure sensor 170 may be operably coupled to a side of tub 108 for detecting the weight of wash tub 108, which controller 156 may use to determine a volume of water in wash chamber 110.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The agitator 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. After articles disposed in wash basket 114 are cleaned and/or washed, the user can remove the articles from wash basket 114, e.g., by reaching into wash basket 114 through opening 116.

Referring now specifically to FIGS. 2 and 3, washing machine appliance 100 may further include a camera assembly 180 that is generally positioned and configured for obtaining images of a load of clothes within wash chamber 110 of washing machine appliance 100. Specifically, according to the illustrated embodiment, camera assembly 180 may include a camera 182 mounted to an underside of door 120 of washing machine appliance 100. In this manner, when door 120 is in the closed position, camera 182 may be positioned over wash chamber 110 and may be oriented for obtaining images within wash chamber 110. Specifically, camera 182 is mounted such that camera 182 faces toward a bottom side of wash tub 108. In this manner, camera 182 can take unobstructed images or video of an inside of wash chamber 110.

It should be appreciated that camera assembly 180 may include any suitable number, type, size, and configuration of camera(s) 182 for obtaining images of wash chamber 110. In general, cameras 182 may include a lens 184 that is constructed from a clear hydrophobic material or which may otherwise be positioned behind a hydrophobic clear lens. So positioned, camera assembly 180 may obtain one or more images or videos of clothes within wash chamber 110, as described in more detail below. It should be appreciated that other locations for mounting camera assembly 180 are possible, such as on control panel 150 with camera 182 directed through a transparent or translucent window in door 120, on wash tub 108, or on cabinet 102.

Referring still to FIGS. 2 through 3, washing machine appliance 100 may further include a tub light 186 that is positioned within cabinet 102 or wash chamber 110 for selectively illuminating wash chamber 110 and the load of clothes positioned therein. Specifically, as shown in FIG. 2, tub light 186 may be integrated into camera assembly 180 and may be positioned immediately adjacent camera 182. According to still other embodiments, tub light 186 may be positioned at any other suitable location within cabinet 102. It should be appreciated that according to alternative embodiments, washing machine appliance 100 may include any other camera or system of imaging devices for obtaining images of the load of clothes. In addition, these cameras may be positioned at any suitable location within cabinet 102, may include any suitable lighting features, and may utilize any suitable photography or imaging technology.

Notably, controller 156 of washing machine appliance 100 (or any other suitable dedicated controller) may be communicatively coupled to camera assembly 180, tub light 186, and other components of washing machine appliance 100. As explained in more detail below, controller 156 may be programmed or configured for analyzing the images obtained by camera assembly 180, e.g., in order to detect tangled articles within wash chamber 110 or other cycle information, and may use this information to make informed decisions regarding the operation of washing machine appliance 100.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well, e.g., horizontal axis washing machine appliances. In addition, aspects of the present subject matter may be utilized in a combination washer/dryer appliance.

Now that the construction of washing machine appliance 100 and the configuration of controller 156 according to exemplary embodiments have been presented, an example method 200 of operating a washing machine appliance will be described. Although the discussion below refers to the example method 200 of operating washing machine appliance 100, one skilled in the art will appreciate that the example method 200 is applicable to the operation of a variety of other washing machine appliances, such as horizontal axis washing machine appliances. In exemplary embodiments, the various method steps as disclosed herein may be performed by controller 156 or a separate, dedicated controller.

Figure 4:
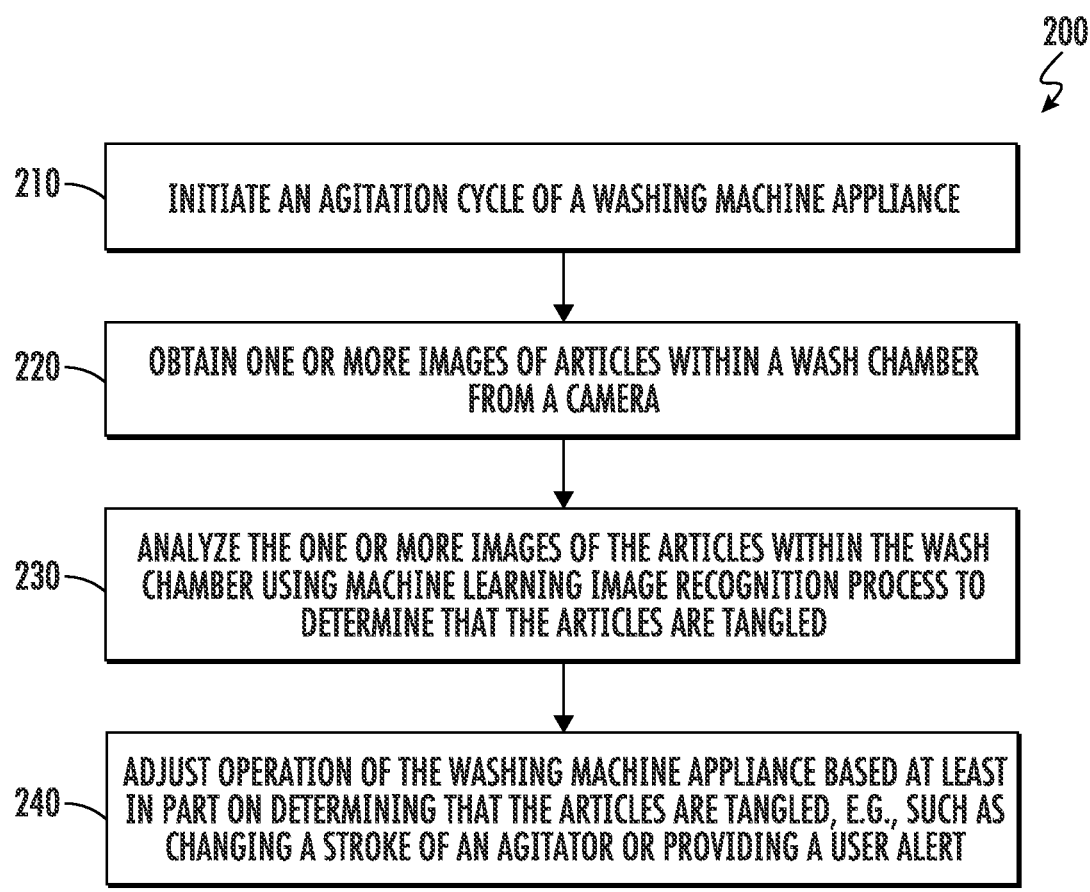
FIG. 4 illustrates a method for operating a washing machine appliance in accordance with one example embodiment of the present subject matter.

Referring now to FIG. 4, method 200 includes, at 210, initiating an agitation cycle of washing machine appliance 100. For example, as described above, controller 156 may activate drive motor 140 in order to oscillate wash basket 114 and/or agitator 132 and thereby urge articles within wash chamber 110 against one another, wash basket 114, and/or agitator 132. Moreover, controller 156 may operate drive motor 140 and transmission assembly 142 during the agitation cycle in order to sequentially oscillate wash basket 114 and/or agitator 132 in a clockwise direction and counterclockwise direction. Thus, articles within wash chamber 110 may be rubbed clean during the agitation cycle. The stroke of wash basket 114 and/or agitator 132 (e.g., the frequency, length, etc. of the stroke) during the clockwise and counterclockwise oscillations may be adjusted, as discussed in greater detail below.

During the agitation cycle, the articles within wash chamber 110 may be more likely to tangle, e.g., relative to other cycles of washing machine appliance 100. For example, the articles within wash chamber 110 may move relative to one another during the agitation cycle, and such relative movement may cause the articles to tangle such the articles are knotted, wrapped, twisted, and/or locked together. When tangled, the articles may not move relative to one another, e.g., to the degree required to clean the articles during the agitation cycle. Method 200 includes features for detecting tangled articles and/or remediating the tangled condition.

At 220, controller 156 obtains one or more images of articles within wash chamber 110 from camera assembly 180, e.g., during the agitation cycle while wash basket 114 and/or agitator 132 oscillate. For instance, camera assembly 180 may take one or more images of wash chamber 110, including any articles located therein. According to example embodiments, one or more still images, one or more video clips, or any other suitable type and number of images suitable for tangling detection analysis may be taken at 220. It should be appreciated that the images obtained by camera assembly 180 may vary in number, frequency, angle, resolution, detail, etc. in order to improve the clarity of the load of articles within wash chamber 110. In addition, according to example embodiments, controller 156 may be configured for illuminating the tub using tub light 186 just prior to and/or while obtaining images. According to still other embodiments, tub light 186 may remain off when camera assembly 180 can obtain suitable images without extra light. For example, if the ambient lighting in a room is sufficient to illuminate wash chamber 110 such that camera assembly 180 may obtain a suitable image facilitating the analysis described herein, tub light 186 may remain off altogether.

At 230, controller 156 analyzes the one or more images from 220 using a machine learning image recognition process to determine that the articles in wash chamber 110 are tangled. As used herein, the term "tangled" and the like are used in a manner known to those skilled in the art, e.g., to describe when articles are knotted, wrapped, twisted, or otherwise locked together such that at least a portion of the articles are generally fixed and/or immovable relative to each other. For instance, shirt sleeves, pant legs, draw cords, etc. may wrap around other articles such that two or more of the articles in wash chamber 110 are tangled.

As used herein, the terms image recognition process, tangling detection, and similar terms may be used generally to refer to any suitable method of observation, analysis, image decomposition, feature extraction, image classification, etc. of one or more image or videos taken within a wash chamber of a washing machine appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 180 and controller 156 may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as a particular garment or region of a load of clothes. In this regard, a "region proposal" may be regions in an image that could belong to a particular object, such as a particular article of clothing. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, at 230. Method 200 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to obtain a quantification of the articles in wash chamber 110. In addition, a K-means algorithm may be used. Other image recognition processes are possible and within the scope of the present subject matter.

It should be appreciated that any other suitable image recognition process may be used while remaining within the scope of the present subject matter. For example, at 230, analyzing the one or more images may include using a deep belief network ("DBN") image recognition process. A DBN image recognition process may generally include stacking many individual unsupervised networks that use each network's hidden layer as the input for the next layer. According to still other embodiments, at 230, method 200 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

According to example embodiments of the present subject matter, the image analysis performed at 230 may generally monitor any suitable qualitative or quantitative aspect of the load of articles or wash chamber 110 which might be indicative of tangling of articles in wash chamber 110. For example, the analysis may include the monitoring of at least one of a color tone, article movement, and a number of edges between articles.

Figure 5:
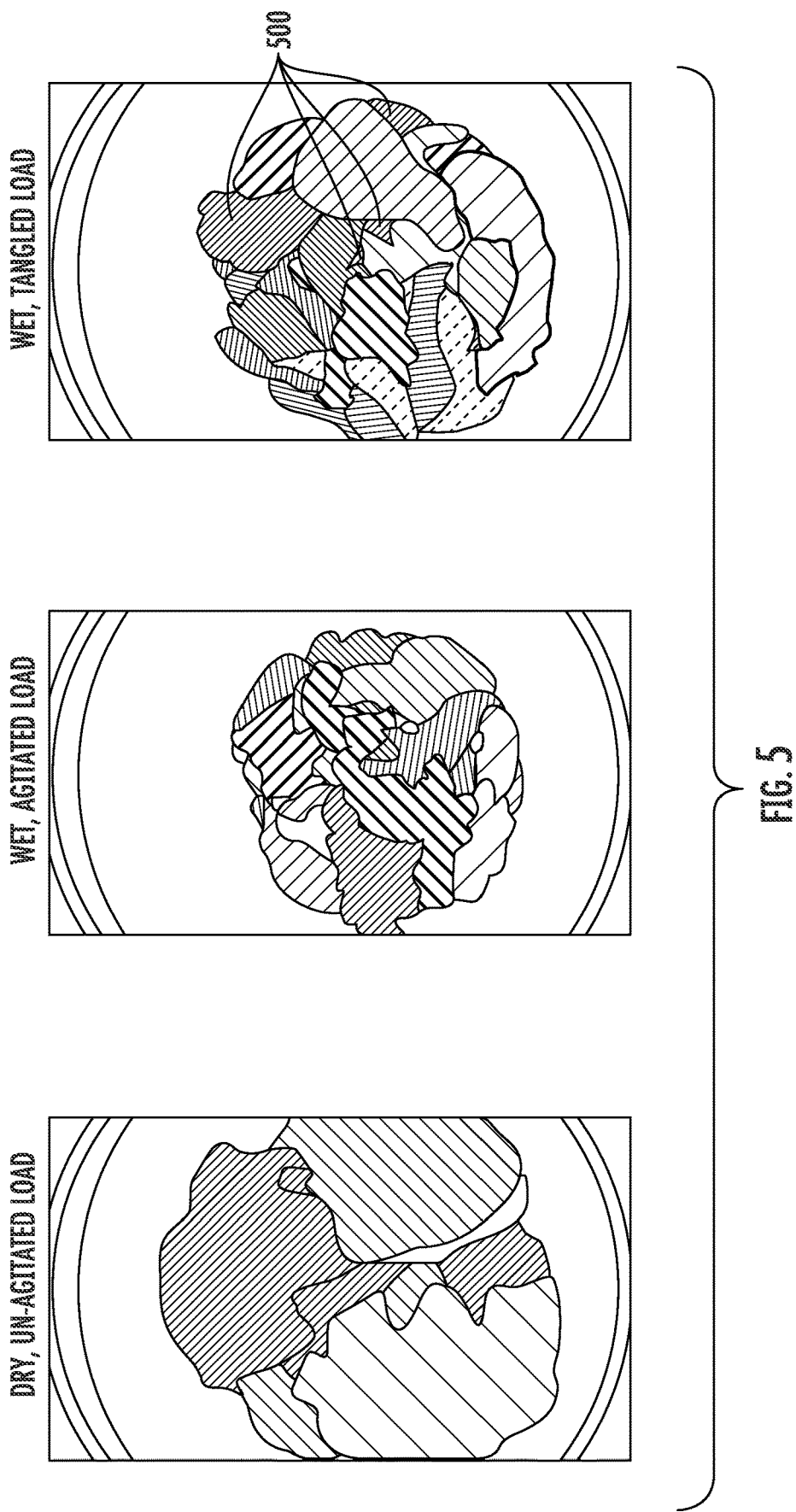
FIGS. 5 through 7 are various images of a load of clothes in a wash chamber according to example embodiments of the present subject matter.

Referring now to FIG. 5, controller 156 may identify a color of at least one of the articles in wash chamber 110 at a plurality of discrete locations in wash basket 110 using the machine learning image recognition process on the one or more images from 220. For instance, as shown in FIG. 5, controller 156 may identify the color of each article in wash chamber 110. In FIG. 5, each article in wash chamber 110 is shown with a respective hatching to represent the different colors of the articles. Controller 156 may determine that the articles in wash chamber 110 are tangled by detecting the color associated with a particular one (or more) of the articles at the plurality of discrete locations in wash basket 110. For instance, when the article is tangled with other articles in wash chamber 110, the particular article may be knotted, wrapped, twisted, or otherwise positioned with the other articles such that the color associated with the particular one of the articles appears in multiple discrete locations in the one or more images from 220, e.g., as indicated with the reference character 500 in FIG. 5, due to the entanglement of the articles. In contrast, when dry or only agitated (i.e., not tangled), the articles in wash chamber 110 may appear only one location or a relatively small number of discrete locations in the one or more images from 220. Thus, e.g., at 230, controller 156 may determine that the articles in wash chamber 110 are tangled when the number of the discrete locations at which the color associated with the particular one (or more) of the articles is detected in the one or more images from 220 exceeds a threshold value. The threshold value may be, e.g., three, four, five, or more discrete locations. Such number of discrete locations may assist with reliably detecting that the articles in wash chamber 110 are tangled, e.g., as compared to simply agitated.

Figure 6:
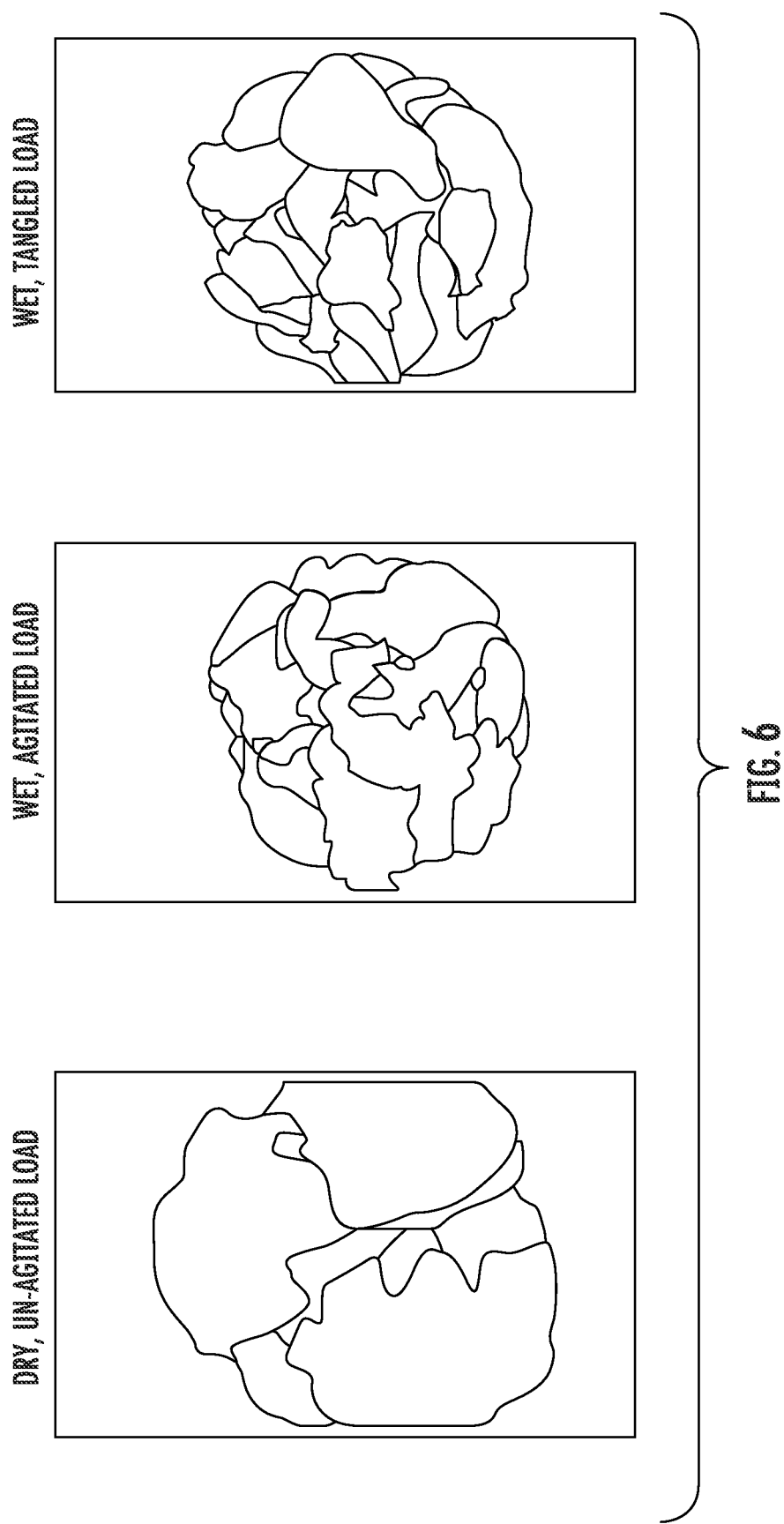

Referring now to FIG. 6, as an alternative or in addition to using the color of the articles as described above, controller 156 may identify a plurality of boundaries between the articles in wash chamber 110 using the machine learning image recognition process on the one or more images from 220, e.g., in the manner shown in FIG. 6. Controller 156 may determine that the articles in wash chamber 110 are tangled by detecting a number of boundaries between the articles in wash chamber 110. For instance, when the articles in wash chamber 110 are tangled, the articles may be knotted, wrapped, twisted, or otherwise positioned together such that the number of boundaries between the articles in is relatively greater than when the articles are dry or only agitated (i.e., not tangled). Thus, e.g., at 230, controller 156 may determine that the articles in wash chamber 110 are tangled when the number of boundaries between the articles in wash chamber 110 detected in the one or more images from 220 exceeds a threshold value. The threshold value may be a relative increase over time, e.g., a three percent (3%) increase, a five percent (5%) increase, a ten percent (10%) increase, or more over time. Such percentage increase may assist with reliably detecting that the articles in wash chamber 110 are tangled. In alternative example embodiments, the threshold value may be an absolute value, e.g., based upon the selected load type, load size, etc.

Figure 7:
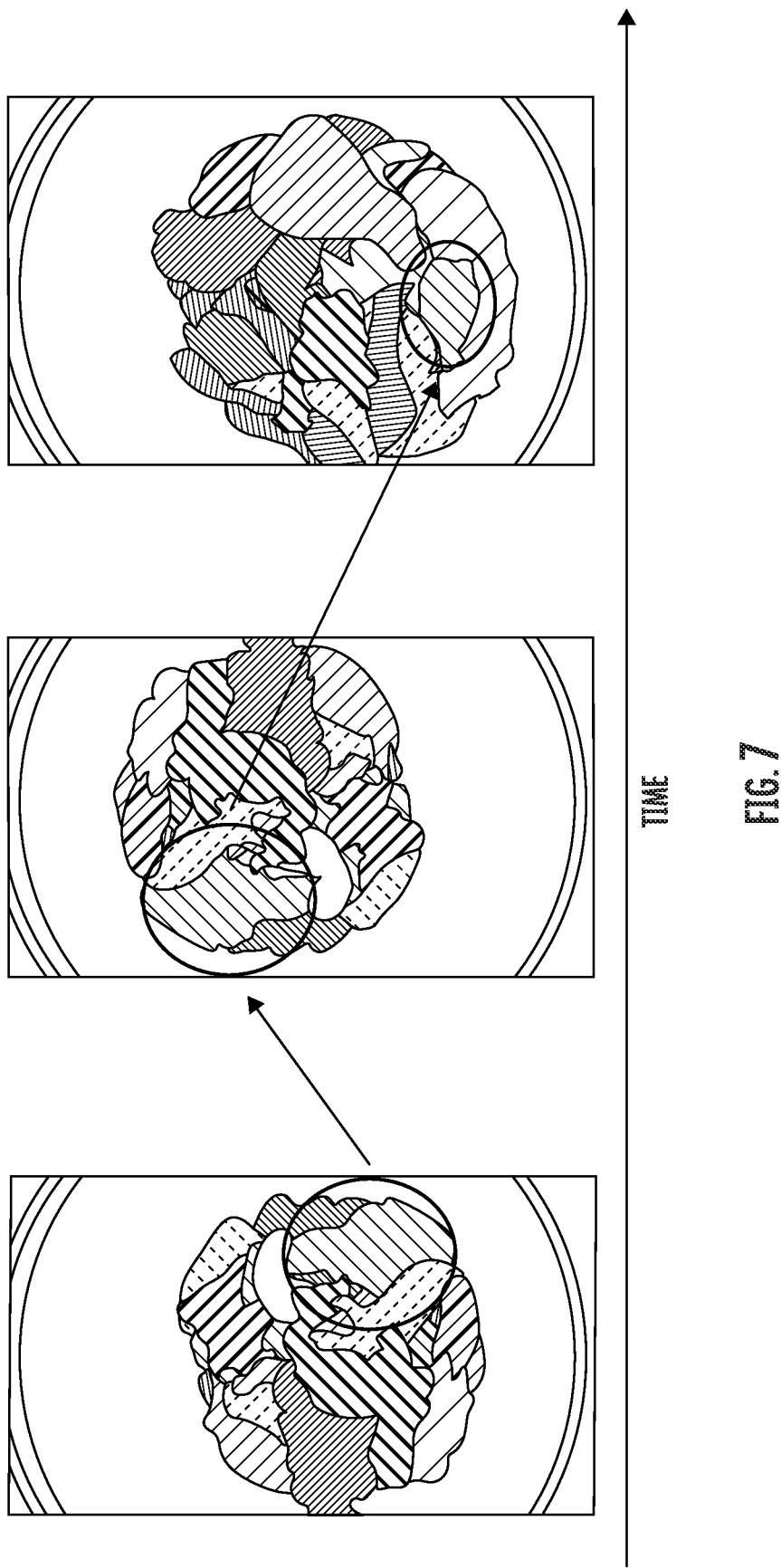

Referring now to FIG. 7, as another example, controller 156 may identify a location of two or more of the articles in wash chamber 110. For instance, as described above with reference to FIG. 5, controller 156 may identify a respective color of each of the articles in wash chamber 110 visible within the one or more images from 220 using the machine learning image recognition process on the one or more images from 220. Controller 156 may also track the location of the two or more of the articles in wash chamber 110 over time, e.g., by tracking the position of the respective color of each of the two or more articles in images from 220 over time, e.g., as the articles move due to oscillation of wash basket 114 and/or agitator 132. Controller 156 may determine that the articles are tangled when the location of the two or more articles changes by less than a threshold amount. For instance, when the articles are tangled in wash chamber 110, the two or more articles may be knotted, wrapped, twisted, or otherwise locked together such that the two or more articles do not move (or move to a limited extend relative to an untangled condition) in the one or more images from 220 due to the entanglement of the articles.

Turning back to FIG. 4, at 240, at least one operating parameter of the washing machine appliance is adjusted based at least in part on determining that the articles within wash chamber 110 are tangled at 230. As used herein, an "operating parameter" of washing machine appliance 100 is any cycle setting, operating time, component setting, spin speed, part configuration, water level, water temperature, valve position, or other operating characteristic that may affect the performance of washing machine appliance 100. Thus, references to operating parameter adjustments or "adjusting at least one operating parameter" are intended to refer to control actions intended to improve system performance to abate the tangling of articles in wash chamber 110. For example, at 240, controller 240 may reduce a stroke length of agitator 132 (e.g., clockwise and/or counterclockwise); add fresh water to wash tub 108 by opening water control valve 166, pause the agitation cycle, and/or terminate the agitation cycle. Thus, controller 156 may be configured for modifying an agitation profile or intensity, a cycle time or duration, or any other suitable cycle parameter. Other operating parameter adjustments are possible and within the scope of the present subject matter.

In addition, adjusting the at least one operating parameter may include providing a user notification, e.g., via a user interface or control panel 150, in the event that the articles in wash chamber 110 are tangled and/or remain tangled after abatement operations. For example, if controller 156 determines that the articles in wash chamber 110 are tangled during the agitation cycle and/or after remediate action to reduce the tangling, controller may prevent further operating cycles, may add more water, and/or may provide a user notification, e.g., via an indicator on control panel 150 or by communication with a remote device via a wireless communication protocol, such as Wi-Fi or Bluetooth.

Figure 8:
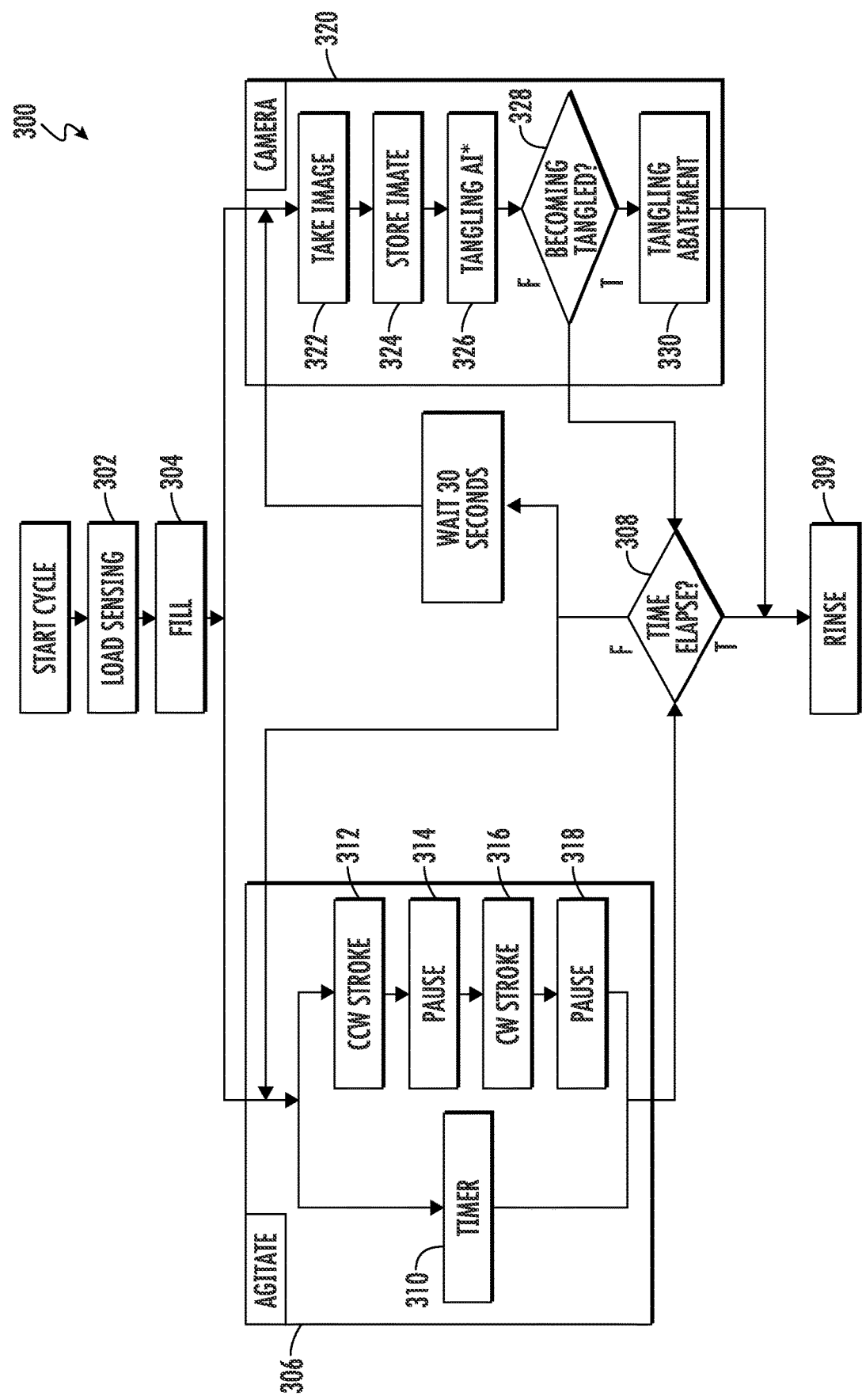
FIG. 8 is a flow diagram of a process for detecting tangling within a washing machine appliance according to an example embodiment of the present subject matter.

Referring now to FIG. 8, an example flow chart or operational diagram of washing machine appliance 100 performing a method 300 of the present subject matter will be described according to an example embodiment. As shown, method 300 includes load sensing at 302, filling at 304, and an agitation cycle at 306. The agitation cycle at 306 is timed with a timer 310 and include a clockwise stroke 312, a pause 314, a counter-clockwise stroke 316, and an additional pause 318. At 308, a check of the timer 310 determines whether the agitation cycle at 306 is complete. If the agitation cycle at 306 has additional time, the clockwise stroke 312, the pause 314, the counter-clockwise stroke 316, and the additional pause 318 are repeated, e.g., until the timer 310 is complete. At 308, when the timer 310 is complete, a rinse cycle 309 is initiated.

Method 300 at 320 also includes obtaining one or more images (e.g., every thirty seconds during the agitation cycle at 306) and analyzing/classifying those images to determine whether articles are tangled during the agitation cycle at 306. For instance, a camera may take one or more images at 322, store the one or more images at 324, and conduct a tangling artificial intelligence at 326 to determine whether articles are tangled. In the event the articles untangled at 328, method 300 operates the agitation cycle at 306 normally. In contrast, at 330, method 300 includes tangling abatement in response to detecting tanging at 328. The tangling abatement at 330 adjusts operation of the washing machine appliance from the normal agitation cycle at 306, e.g., in order to remediate the tangling of articles. After the tangling abatement at 330, method 300 proceeds to the rinse cycle 309. The various elements of the operation of the camera to detect that articles are tangled, including tangling artificial intelligence at 326 and/or the tangling abatement at 330, may be conducted in the manner described above for method 200.

FIGS. 4 and 8 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of methods 200 and 300 are explained using washing machine appliance 100 as an example, it should be appreciated that these methods may be applied to the operation of any suitable washing machine appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
a wash tub positioned within a cabinet;
a wash basket rotatably mounted within the wash tub and defining a wash chamber configured for receiving a load of articles;
a camera mounted to the cabinet in view of the wash chamber; and
a controller operably coupled to the camera, the controller configured to
obtain one or more images of the articles within the wash chamber from the camera during an agitation cycle;
analyze the one or more images using a machine learning image recognition process to determine that the articles are tangled during the agitation cycle, wherein analyzing the one or more images with the controller comprises identifying a plurality of boundaries between the articles and determining that the articles are tangled in response to the plurality of boundaries exceeding a threshold value; and
adjust at least one operating parameter of the washing machine appliance in response to determining that the articles are tangled during the agitation cycle.

2. The washing machine appliance of claim 1, further comprising an agitator disposed within the wash basket, the agitator rotatable relative to the wash basket.

3. The washing machine appliance of claim 2, wherein the controller is further configured to obtain the one or more images of the articles within the wash chamber from the camera during the agitation cycle, the agitator rotating relative to the wash basket during the agitation cycle.

4. The washing machine appliance of claim 3, wherein the controller is configured to adjust the at least one operating parameter of the washing machine appliance by reducing a stroke length of the agitator in response to determining that the articles are tangled.

5. The washing machine appliance of claim 3, wherein the controller is configured to adjust the at least one operating parameter of the washing machine appliance by adding fresh water to the wash tub in response to determining that the articles are tangled.

6. The washing machine appliance of claim 3, wherein the controller is configured to adjust the at least one operating parameter of the washing machine appliance by pausing the agitation cycle and providing a user notification in response to determining that the articles are tangled.

7. The washing machine appliance of claim 3, wherein the controller is configured to adjust the at least one operating parameter of the washing machine appliance by terminating the agitation cycle in response to determining that the articles are tangled.

8. The washing machine appliance of claim 1, wherein the machine learning image recognition process comprises at least one of a convolution neural network ("CNN"), a region-based convolution neural network ("R-CNN"), a deep belief network ("DBN"), or a deep neural network ("DNN") image recognition process.

9. The washing machine appliance of claim 1, wherein analyzing the one or more images with the controller comprises:
identifying a color of at least one of the articles at a plurality of discrete locations; and
determining that the articles are tangled when a number of the discrete locations exceeds a threshold value.

10. The washing machine appliance of claim 1, wherein analyzing the one or more images with the controller comprises:
identifying a location of two or more of the articles;
tracking the location of the two or more of the articles over time; and
determining that the articles are tangled when the location of the two or more of the articles changes by less than a threshold amount.

11. The washing machine appliance of claim 1, further comprising a light source for illuminating the wash chamber while obtaining the one or more images.

12. The washing machine appliance of claim 1, wherein the cabinet comprises a door pivotally mounted at a top portion of the cabinet, and the camera is mounted to the door and faces the wash chamber.

13. The washing machine appliance of claim 1, wherein the cabinet comprises a control panel and a door, the control panel is positioned over the wash chamber, the door is pivotally mounted at a top portion of the cabinet and comprises a window, and the camera is mounted to the control panel and faces the wash chamber through the window of the door.

14. A method of operating a washing machine appliance, the washing machine appliance comprising a wash basket rotatably mounted within a wash tub and defining a wash chamber configured for receiving of a load of articles, a camera is positioned with a view of the wash chamber, the method comprising:
 obtaining one or more images of the wash chamber with the camera during an agitation cycle;
 analyzing the one or more images using a machine learning image recognition process to determine that the articles are tangled during the agitation cycle, wherein analyzing the one or more images with the controller comprises identifying a plurality of boundaries between the articles and determining that the articles are tangled in response to the plurality of boundaries exceeding a threshold value; and
 adjusting at least one operating parameter of the washing machine appliance in response to determining that the articles are tangled during the agitation cycle.

15. The method of claim 14, wherein obtaining the one or more images of the wash chamber comprises obtaining the one or more images of the wash chamber during the agitation cycle, an agitator rotating relative to the wash basket during the agitation cycle.

16. The method of claim 15, wherein adjusting the at least one operating parameter of the washing machine appliance comprises one or more of:
 reducing a stroke length of the agitator;
 adding fresh water to the wash tub;
 pausing the agitation cycle and providing a user notification; and
 terminating the agitation cycle.

17. The method of claim 14, wherein analyzing the one or more images comprises:
 identifying a color of at least one of the articles at a plurality of discrete locations; and
 determining that the articles are tangled when a number of the discrete locations exceeds a threshold value.

18. The method of claim 14, wherein analyzing the one or more images with the controller comprises:
 identifying a location of two or more of the articles;
 tracking the location of the two or more of the articles over time; and
 determining that the articles are tangled when the location of the two or more of the articles changes by less than a threshold amount.

* * * * *